(12) United States Patent
Memory et al.

(10) Patent No.: US 7,798,079 B2
(45) Date of Patent: Sep. 21, 2010

(54) PRESSURE SUPPLY ASSEMBLY FOR AN AGRICULTURAL IMPLEMENT WITH DENSE PHASE PRODUCT FLOW

(75) Inventors: Russell James Memory, Saskatoon (CA); Dean Jay Mayerle, Saskatoon (CA)

(73) Assignee: CNH Canada, Ltd. (CA)

( * ) Notice: Subject to any disclaimer, the term of this patent is extended or adjusted under 35 U.S.C. 154(b) by 0 days.

(21) Appl. No.: 12/271,808

(22) Filed: Nov. 14, 2008

(65) Prior Publication Data

US 2010/0122649 A1 May 20, 2010

(51) Int. Cl.
*A01C 7/00* (2006.01)
*A01C 9/00* (2006.01)
*A01C 15/00* (2006.01)

(52) U.S. Cl. .................................... 111/174; 111/200
(58) Field of Classification Search ................. 111/174, 111/200
See application file for complete search history.

(56) References Cited

U.S. PATENT DOCUMENTS

| | | | |
|---|---|---|---|
| 524,474 A | 8/1894 | Wade | |
| 670,534 A | 3/1901 | Carmical | |
| 1,369,649 A | 2/1921 | Gieseler | |
| 2,062,295 A | 12/1936 | Cary et al. | |
| 2,171,205 A | 8/1939 | Zinke | |
| 2,193,738 A | 3/1940 | Perrin | |
| 2,559,183 A | 7/1951 | Barnett | |
| 2,671,690 A | 3/1954 | Von Ehrenkrook | |
| 2,683,347 A * | 7/1954 | Abdo | 60/242 |
| 2,814,531 A | 11/1957 | Murray, Jr. | |
| 2,937,049 A | 5/1960 | Osawa | |
| 3,197,261 A | 7/1965 | Kauffman | |
| 3,207,560 A | 9/1965 | Brown | |
| 3,376,897 A | 4/1968 | Dolder et al. | |
| 3,386,474 A | 6/1968 | Kimmel | |
| 3,387,895 A | 6/1968 | Hochmuth et al. | |
| 3,425,218 A * | 2/1969 | Attebo | 60/486 |
| 3,502,002 A * | 3/1970 | Whiteman, Jr. | 91/178 |
| 3,515,315 A | 6/1970 | Kidd | |
| 3,543,704 A | 12/1970 | Hansen | |
| 3,544,171 A * | 12/1970 | Swiden et al. | 303/117.1 |
| 3,548,765 A | 12/1970 | Grataloup | |
| 4,036,408 A | 7/1977 | Dugge | |
| 4,082,364 A | 4/1978 | Krambrock | |
| 4,200,412 A | 4/1980 | Steele | |
| 4,244,522 A | 1/1981 | Hartwig | |
| 4,264,243 A | 4/1981 | Bentzen-Bilkvist | |
| 4,280,419 A | 7/1981 | Fischer | |

(Continued)

FOREIGN PATENT DOCUMENTS

BR 9501580-9 A 11/1995

(Continued)

*Primary Examiner*—Christopher J. Novosad
(74) *Attorney, Agent, or Firm*—Rebecca Henkel

(57) ABSTRACT

A system for distributing a product on an agricultural implement is provided. The system comprises a primary container having a primary container inlet and a product exit, and the primary container is configured to accommodate the product and permit the product to move through the product exit in response to fluid pressure. The system further comprises a pressure supply assembly including a pressure source that provides a pressurized fluid to the primary container through the primary container inlet. The system further comprises a delivery conduit having a first end connected to the product exit and is configured to permit the product to pass there through by dense phase flow.

1 Claim, 3 Drawing Sheets

U.S. PATENT DOCUMENTS

| | | | |
|---|---|---|---|
| 4,379,664 A | 4/1983 | Klein et al. | |
| 4,413,935 A | 11/1983 | Smith et al. | |
| 4,506,704 A | 3/1985 | Boom et al. | |
| 4,553,882 A | 11/1985 | Knappertz | |
| 4,562,779 A | 1/1986 | Briggs | |
| 4,674,922 A | 6/1987 | Federhen et al. | |
| 4,738,770 A | 4/1988 | Hastings et al. | |
| 4,779,765 A | 10/1988 | Neumeyer | |
| 4,793,743 A | 12/1988 | Grodecki et al. | |
| 4,843,983 A | 7/1989 | Olson | |
| 4,872,785 A | 10/1989 | Schrage et al. | |
| 5,033,914 A | 7/1991 | Wuertele et al. | |
| 5,069,583 A | 12/1991 | Caldwell | |
| 5,156,102 A | 10/1992 | Andersen | |
| 5,161,473 A | 11/1992 | Landphair et al. | |
| 5,240,355 A | 8/1993 | Hudalla | |
| 5,379,706 A | 1/1995 | Gage et al. | |
| 5,392,722 A | 2/1995 | Snipes et al. | |
| 5,407,305 A | 4/1995 | Wallace | |
| 5,494,381 A | 2/1996 | Heyl et al. | |
| 5,575,225 A | 11/1996 | Smith et al. | |
| 5,749,682 A | 5/1998 | Epting | |
| 5,813,801 A | 9/1998 | Newbolt et al. | |
| 5,878,679 A | 3/1999 | Gregor et al. | |
| 5,927,217 A | 7/1999 | Halford et al. | |
| 6,047,652 A | 4/2000 | Prairie et al. | |
| 6,253,693 B1 | 7/2001 | Mayerle et al. | |
| 6,298,797 B1 | 10/2001 | Mayerle et al. | |
| 6,308,645 B1 | 10/2001 | Newkirk et al. | |
| 6,308,646 B1 | 10/2001 | Luxon | |
| 6,311,727 B1 | 11/2001 | Campau | |
| 6,343,896 B1 | 2/2002 | Goodier et al. | |
| 6,499,413 B2 | 12/2002 | Kleinknecht et al. | |
| 6,505,569 B1 | 1/2003 | Richard | |
| 6,581,532 B1 | 6/2003 | Hagen et al. | |
| 6,584,919 B2 | 7/2003 | McQuinn | |
| 6,644,225 B2 | 11/2003 | Keaton | |
| 6,648,558 B1 | 11/2003 | Shultz | |
| 6,742,464 B1 | 6/2004 | Chiu | |
| 6,782,835 B2 | 8/2004 | Lee et al. | |
| 6,854,405 B2 | 2/2005 | Memory | |
| 6,899,042 B1 | 5/2005 | Kowalchuk | |
| 6,904,851 B2 | 6/2005 | Memory | |
| 6,928,938 B2 | 8/2005 | Memory | |
| 6,928,939 B1 | 8/2005 | Johnson et al. | |
| 6,935,254 B2 | 8/2005 | Ostrander et al. | |
| 7,017,502 B2 | 3/2006 | Quam et al. | |
| 7,040,242 B2 | 5/2006 | Memory | |
| 7,048,475 B2 | 5/2006 | Cloue et al. | |
| 7,101,120 B2 | 9/2006 | Jurkovich | |
| 7,213,525 B2 | 5/2007 | Meyer et al. | |
| 7,267,061 B2 | 9/2007 | Mayerle | |
| 7,270,064 B2 | 9/2007 | Kjelsson et al. | |
| 2006/0243179 A1 | 11/2006 | Landphair et al. | |
| 2007/0022928 A1 | 2/2007 | Kowalchuk | |
| 2007/0079780 A1* | 4/2007 | Ling et al. | 123/90.12 |
| 2007/0181048 A1 | 8/2007 | Pleyer | |

FOREIGN PATENT DOCUMENTS

| | | |
|---|---|---|
| DE | 3528301 A1 | 2/1987 |
| DE | 19620016 A1 | 11/1997 |
| DE | 10006811 A1 | 1/2001 |
| EP | 0331302 A1 | 6/1989 |
| GB | 2064021 A | 6/1981 |
| GB | 2096085 A | 10/1982 |
| GB | 2222131 A | 2/1990 |
| JP | 61111227 A | 5/1986 |
| JP | 01013311 A | 1/1989 |
| JP | 06092454 A | 4/1994 |
| JP | 2003070329 A | 3/2003 |
| JP | 2003081425 A | 3/2003 |

* cited by examiner

PRESSURE SUPPLY ASSEMBLY FOR AN AGRICULTURAL IMPLEMENT WITH DENSE PHASE PRODUCT FLOW

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The invention relates to pressure supply assemblies for agricultural implements, especially agricultural implements that use dense phase product flow to deliver a product from a primary container. The invention also relates to pressure supply assemblies for agricultural metering devices.

BACKGROUND OF THE INVENTION

Agricultural implements, such as planters and seed dispensers, typically include a system of conduits through which a dispensed product, such as seed, is distributed. In addition, a pressurized fluid, such as air, also moves through the system of conduits to move the product. A number of designs currently exist for moving the product to different locations on an agricultural implement using the pressurized fluid. However, most current designs use a fan or blower assembly to provide a large volume of the pressurized fluid at a low pressure. The pressurized fluid moves a relatively low volume of the dispensed product, and therefore, considering the power input requirements of blower assemblies, current designs are relatively inefficient.

In addition, effective agricultural implements accommodate different types of dispensed products, such as seeds of different shape or size. Different types of dispensed products, however, may be better suited to different operating characteristics, such as pressurized fluid flow rate and pressure. For example, a certain type of seed may require increased fluid pressure to move through system conduits due to relatively high friction of the seed within the system conduits. As another example, another type of seed may have a relatively high resistance to airflow due to the shape of the seed. Some current designs can physically accommodate different types of dispensed products while the products are stationary. However, current designs cannot effectively move different types of dispensed products because the operating characteristics of the systems cannot be adjusted.

Further still, many agricultural implements include assemblies or components that have different pressure requirements from the pressurized fluid supplied from, for example, the blower assembly. As a result, some current designs include multiple pressure sources that supply pressurized fluid to individual assemblies or components. Multiple pressure sources, however, add to the overall cost of the agricultural implement.

Considering the limitations of previous agricultural implements, an efficient and inexpensive system is needed in which a pressurized fluid may be supplied to one or more assemblies.

SUMMARY OF THE INVENTION

In some embodiments, the present invention provides a pressure supply assembly for distributing a product on an agricultural implement. The pressure supply assembly comprises a pressure source including a piston and a cylinder in which the piston moves. The cylinder includes a bore side, a bore side inlet configured to permit a fluid to enter the bore side there through, a bore side outlet configured to permit the fluid to exit the bore side there through and in fluid communication with another section of the agricultural implement. The pressure supply assembly also includes an actuator connected to the piston to displace the piston within the cylinder.

In some embodiments, the actuator is a hydraulic actuator.

In some embodiments, the bore side outlet is in fluid communication with a primary container and a delivery conduit that are configured for dense phase product flow.

In some embodiments, the pressure source is in fluid communication with a metering assembly.

In some embodiments, the pressure source is in fluid communication with a metering assembly.

In some embodiments, the present invention provides a pressure supply assembly for distributing a product on an agricultural implement. The pressure supply assembly comprises a pressure source including a compressor, a compressor conduit through which the compressor outputs a pressurized fluid, and a compressor outlet regulator through which the compressor is in fluid communication with another section of the agricultural implement.

In some embodiments, the compressor is in fluid communication with a primary container and a delivery conduit that are configured for dense phase product flow.

In some embodiments, the pressure supply assembly further comprises a receiver vessel positioned fluidly between the compressor and the primary container.

In some embodiments, the compressor further comprises a compressor inlet, further comprising a vacuum metering assembly in fluid communication with the compressor inlet, and further comprising a compressor inlet regulator positioned fluidly between the compressor inlet and the vacuum metering assembly.

In some embodiments, the pressure source is in fluid communication with a metering assembly.

In some embodiments, the present invention provides a system for distributing a product on an agricultural implement. The system comprises a primary container having a primary container inlet and a product exit, and the primary container is configured to accommodate the product and permit the product to move through the product exit in response to fluid pressure. The system further comprises a pressure supply assembly including a pressure source that provides a pressurized fluid to the primary container through the primary container inlet. The system further comprises a delivery conduit having a first end connected to the product exit and is configured to permit the product to pass there through by dense phase flow.

In some embodiments, the pressure source is a piston assembly.

In some embodiments, the piston assembly includes an actuator connected to a piston to displace the piston.

In some embodiments, the actuator is a hydraulic actuator.

In some embodiments, the pressure source includes a compressor.

In some embodiments, the pressure supply assembly further includes a receiver vessel positioned fluidly between the pressure source and the primary container.

In some embodiments, the pressure supply assembly further includes an inlet regulator positioned fluidly between the receiver vessel and the primary container.

In some embodiments, the system further comprises a low pressure metering assembly in fluid communication with the receiver vessel.

In some embodiments, the pressure supply assembly further includes an inlet regulator positioned fluidly between the receiver vessel and the primary container, and the low pressure metering assembly includes a low pressure delivery device and a low pressure assembly regulator, the low pressure assembly regulator is positioned fluidly between the low pressure delivery device and the receiver vessel.

In some embodiments, the system further comprises a vacuum metering assembly in fluid communication with the pressure source.

In some embodiments, the vacuum metering assembly includes a receiver vessel and a vacuum metering device, and the receiver vessel is positioned fluidly between the vacuum metering device and the pressure source.

In some embodiments, the vacuum metering assembly further includes a vacuum assembly regulator positioned fluidly between the receiver vessel and the vacuum metering device.

In some embodiments, the present invention provides a system for distributing a product on an agricultural implement. The system comprises a primary container having a primary container inlet and a product exit, and the primary container is configured to accommodate the product and permit the product to move through the product exit in response to fluid pressure. The system further comprises a pressure supply assembly including a pressure source that provides a pressurized fluid to the primary container through the primary container inlet. The pressure supply assembly comprises a piston, a cylinder in which the piston moves, and a hydraulic actuator connected to the piston to displace the piston within the cylinder. The system further comprises a delivery conduit having a first end connected to the product exit and is configured to permit the product to pass there through by dense phase flow. The system further comprises a metering assembly in fluid communication with the pressure supply assembly.

In some embodiments, the pressure supply assembly further includes a receiver vessel positioned fluidly between the pressure source and the primary container.

In some embodiments, the metering assembly is a low pressure metering assembly, and the receiver vessel is positioned fluidly between the cylinder and the metering assembly.

In some embodiments, the metering assembly is a vacuum metering assembly in fluid communication with an inlet of the pressure source.

In some embodiments, the vacuum metering assembly includes a receiver vessel and a vacuum metering device, and the receiver vessel is positioned fluidly between the vacuum metering device and the pressure source.

In some embodiments, the present invention provides a method of distributing a pressurized fluid and moving a dispensed product to different sections of an agricultural implement, comprising the steps of: supplying the pressurized fluid from a pressure source to a primary container to effect movement of the dispensed product within the primary container, moving the dispensed product within a delivery conduit by dense phase flow, and supplying the pressurized fluid from the pressure source to a low pressure metering assembly.

In some embodiments, the method further comprises the step of supplying the pressurized fluid from a piston assembly of the pressure source.

In some embodiments, the method further comprises the step of supplying the pressurized fluid from a piston that is displaced by a hydraulic actuator of the piston assembly.

In some embodiments, the method further comprises the step of storing the pressurized fluid in a receiver vessel before supplying the pressurized fluid to the primary container.

In some embodiments, the pressurized fluid is stored at a first pressure in the receiver vessel, the pressurized fluid is supplied to the primary container at a second pressure, and the first pressure is greater than the second pressure.

In some embodiments, the pressure source supplies the pressurized fluid at a pressure of at most 1 bar.

In some embodiments, the pressurized fluid is regulated to enter the primary container at a different pressure than the pressurized fluid is regulated to enter the low pressure metering assembly.

In some embodiments, the present invention provides a method of distributing a pressurized fluid and moving a dispensed product to different sections of an agricultural implement, comprising the steps of supplying the pressurized fluid from a pressure source to a primary container to effect movement of the dispensed product within the primary container, moving the dispensed product within a delivery conduit by dense phase flow, and reducing pressure within a vacuum metering assembly by operating the pressure source.

In some embodiments, the method further comprises the step of supplying the pressurized fluid from a piston assembly of the pressure source.

In some embodiments, the method further comprises the step of supplying the pressurized fluid from a piston that is displaced by a hydraulic actuator of the piston assembly.

In some embodiments, the method further comprises the step of storing the pressurized fluid in a receiver vessel before supplying the pressurized fluid to the primary container.

In some embodiments, the pressurized fluid is stored at a first pressure in the receiver vessel, the pressurized fluid is supplied to the primary container at a second pressure, and the first pressure is greater than the second pressure.

In some embodiments, the pressure source provides the pressurized fluid at a pressure of at most 1 bar.

The foregoing and other objects and advantages of the invention will appear in the detailed description that follows. In the description, reference is made to the accompanying drawings that illustrate a preferred embodiment of the invention.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENT

The following applications, each having a filing date of Nov. 14, 2008, are hereby incorporated by reference as if fully set forth herein: U.S. application Ser. No. 12/271,618 ("Sectional Distribution of Granular Product"); U.S. application Ser. No. 12/271,679 ("Agricultural Implement with Dense Phase Product Flow from a Primary Container"); U.S. application Ser. No. 12/271,723 ("Device and Method for Dense Phase Transport of Seed"); U.S. application Ser. No. 12/271,745 ("Agricultural Implement with Dense Phase Product Dispensing and Purging"); U.S. application Ser. No. 12/271,765 ("Valve and Method for Dense Phase Flow Control"); U.S. application Ser. No. 12/271,787 ("Dense Phase Distribution Branch"); U.S. application Ser. No. 12/271,816 ("Dense Phase Induction System and Method"); and U.S. application Ser. No. 12/271,822 ("Granular Containment Assembly and Method").

Figure 1:
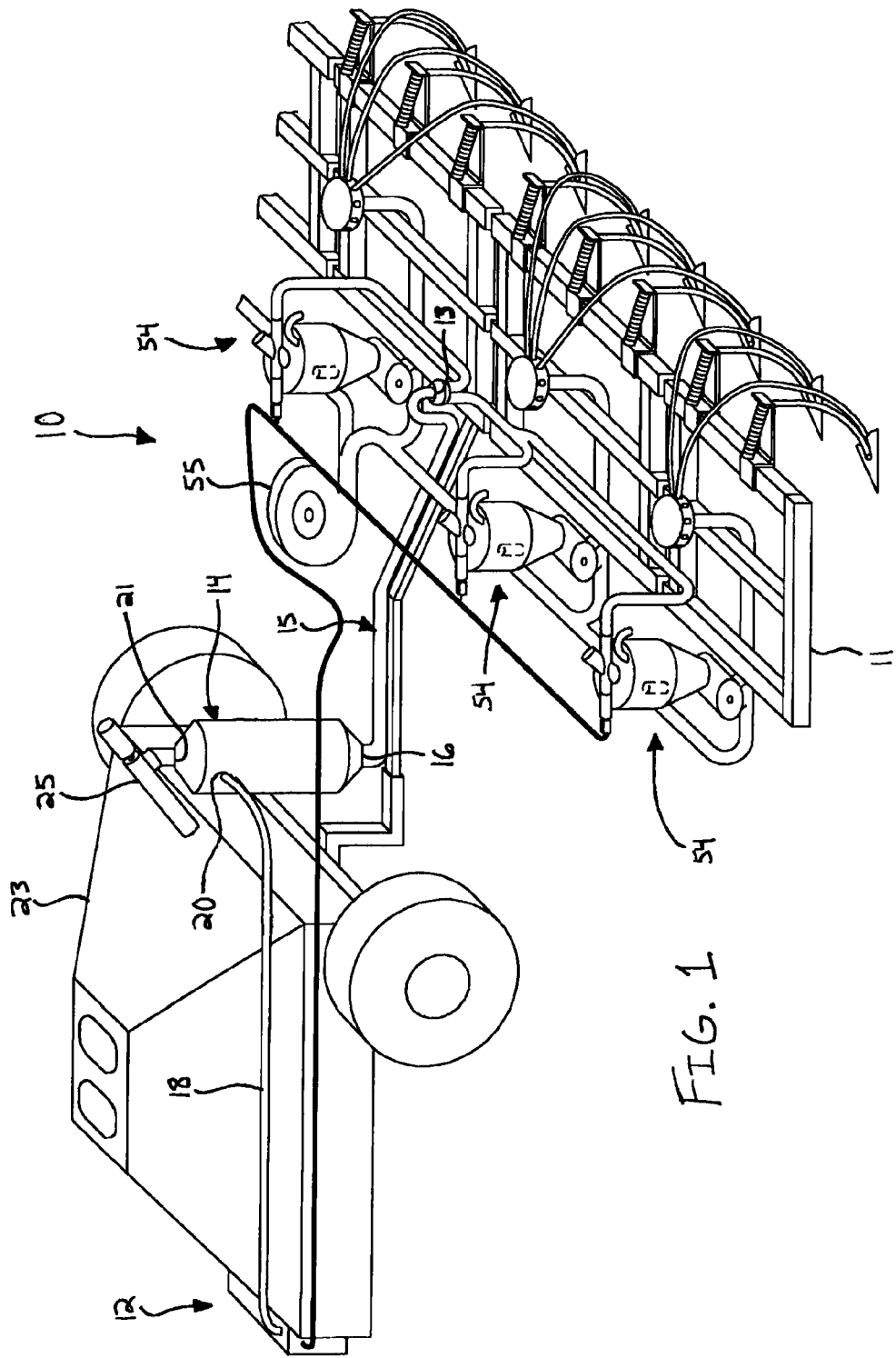
FIG. 1 is a perspective view of an agricultural implement including a product delivery system for distributing a dispensed product to various locations on the agricultural implement according to the present invention.
Figure 2:
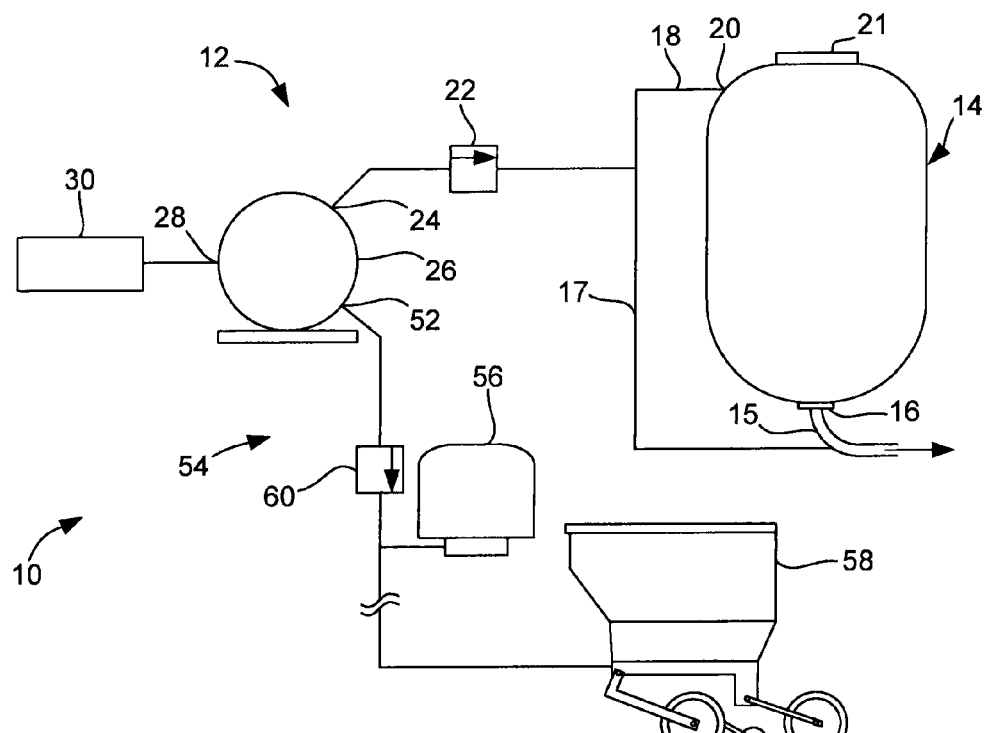
FIG. 2 is a schematic representation of a system of the present invention illustrating an optional low pressure metering assembly.
Figure 3:
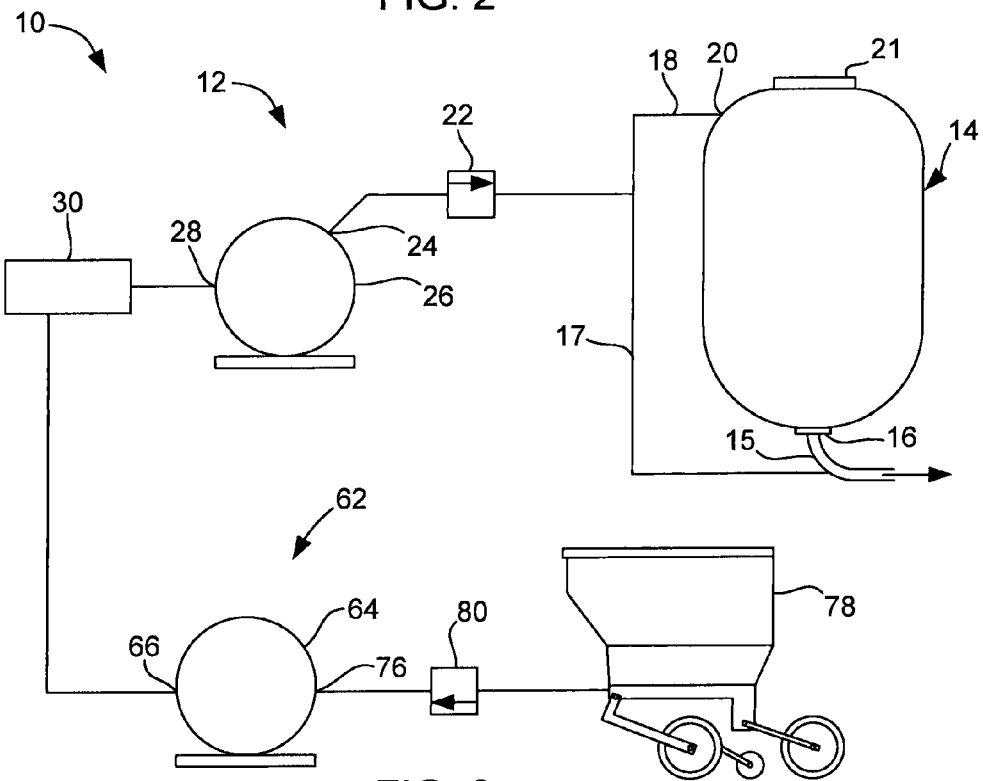
FIG. 3 is a schematic representation of the system of the present invention illustrating an optional vacuum metering assembly.

Referring to FIG. 1, the present invention provides a product delivery system 10 positioned on a frame 11 of an agricultural implement. The agricultural implement may be an air seeder, as shown in FIG. 1, or another type of agricultural implement, such as a planter or the like. Referring to FIGS. 1-3, the product delivery system 10 for distributing product to various locations on the agricultural implement includes a pressure supply assembly 12 that is in fluid communication with a primary container 14 and a delivery conduit 15. The primary container 14 stores the product before a pressurized fluid from the pressure supply assembly 12 and/or gravity forces the product through a product exit 16 of the primary container 14. The product flows in a delivery direction proceeding from a first end of the delivery conduit 15 to a discharge end 13 (FIG. 1) of the delivery conduit 15 after exiting the primary container 14.

In general, the primary container 14 includes the product exit 16 and a primary container inlet 20 for fluid communication with the delivery conduit 15 and the pressure supply assembly 12, respectively, and a hatch 21 through which the dispensed product may be added to the primary container 14. The primary container 14 is an otherwise sealed container to prevent the pressurized fluid from leaking to the outside environment. In some embodiments, the primary container inlet 20 is near an end of the primary container 14 opposite the product exit 16. In the context of the primary container 14, the term 'opposite' should be understood to mean that the primary container inlet 20 and the product exit 16 are non-adjacent, and the primary container inlet 20 is spaced apart from an upper surface of the product when the primary container 14 is filled with the product. A conventional hopper (not shown) may be positioned adjacent the hatch 21 to supply the product to the primary container 14 before sealing the hatch 21. Additionally, and referring to FIG. 1, a product tank 23 may supply the product to the primary container 14 through an auger assembly 25 and the hatch 21. The primary container 14 may be oriented vertically to aid flow of the product into the delivery conduit 15, although other configurations are also possible.

Referring to FIGS. 2 and 3, the pressure supply assembly 12 includes a pressure source 30 that is in fluid communication with the primary container 14 through a container inlet conduit 18. The pressure source 30 will be described in further detail below. The container inlet conduit 18 connects to the primary container inlet 20 of the primary container 14. In some embodiments, the container inlet conduit 18 may connect to a container bypass conduit 17 that connects to the delivery conduit 15 proximate the product exit 16. The container bypass conduit 17 may aid flow of the product within the delivery conduit 15. The container inlet conduit 18 may also connect to an inlet regulator 22 that is operable to adjust the pressure of the fluid entering the primary container 14. The inlet regulator 22 may be in fluid communication with an outlet 24 of a receiver vessel 26 that stores the pressurized fluid from the pressure source 30. The receiver vessel 26 may also be advantageous if periods of high output of the pressurized fluid from the pressure supply assembly 12 are needed. The receiver vessel 26, if included, is in fluid communication with the pressure source 30 through a receiver inlet 28.

Figure 4:
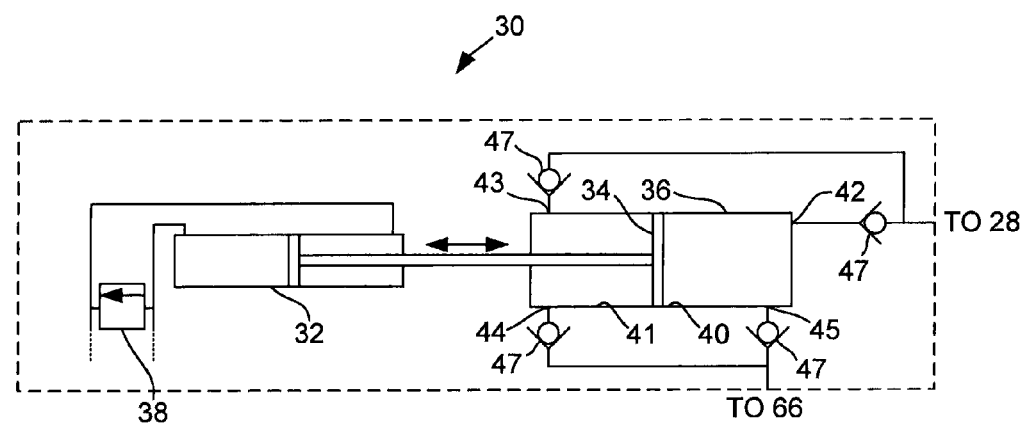
FIG. 4 is a schematic representation of a piston assembly of some embodiments of the system.

Referring to FIG. 4, the pressure source 30 is advantageously a piston assembly that includes an actuator 32 that moves a piston 34 within a cylinder 36. The actuator 32 is fed by a different source than the fluid supplied to the primary container 14. For example, the actuator 32 may be a hydraulic actuator in fluid communication with a hydraulic pump (not shown) and tank (not shown). The ports of the actuator 32 may be in fluid communication through an actuator regulator 38. The actuator 32 forces fluid in the cylinder 36 to exit the cylinder 36 and move towards the inlet 28 of the receiver vessel 26. Specifically, fluid in a bore side 40 of the cylinder 36 is forced through a bore side outlet 42. Additionally, the actuator 32 may also force fluid in a rod side 41 of the cylinder 36 through a rod side outlet 43, advantageously resulting in a piston assembly that provides pressurized fluid in both directions of movement of the piston 34. The cylinder 36 also includes a rod side inlet 44 and a bore side inlet 45 that may be open to the outside environment or connect to other components of the system 10 as described below. In addition, the outlets 42 and 43 and inlets 44 and 45 are in fluid communication with check valves 47 to prevent the pressurized fluid from flowing in two directions. Regarding the dimensions of the piston assembly, the piston 34 may have a diameter of 10 inches and the cylinder 36 may accommodate a piston stroke of 12 inches to move the product through the delivery conduit 15 having a diameter of 2 inches. However, the dimensions of the components of the system 10 may be modified depending on the type of the dispensed product that is used.

Figure 5:
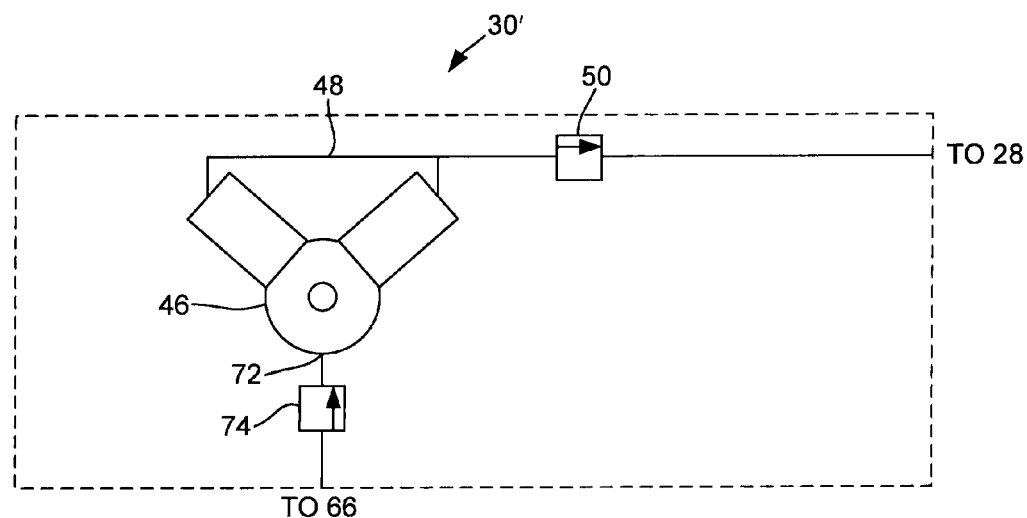
FIG. 5 is a schematic representation of a compressor of some embodiments of the system.

Referring now to FIG. 5, the pressure supply assembly may include an alternative pressure source 30' in place of the piston assembly. The pressure source 30' includes a compressor 46 in fluid communication with a compressor outlet regulator 50 through a compressor conduit 48. The compressor outlet regulator 50 may be operable to limit the pressure of the pressurized fluid supplied to the primary container 14, or, if included, the receiver vessel 26. A compressor inlet 72 may be in fluid communication with a compressor inlet regulator 74 and other components of the system 10 as described below.

The pressure sources 30 and 30' are advantageously designed to provide a pressurized fluid at a pressure less than 1 bar. Systems operating at a pressure less than 1 bar may not require certification in some jurisdictions, thereby advantageously lowering the cost of the agricultural implement.

The assemblies and components described above advantageously result in the product moving within the delivery conduit 15 in dense phase flow. Dense phase flow can be described as a flow in which product is extruded from the system 10 when a threshold pressure has been exceeded within the primary container 14. The leading edge of the dispensed product is moved by the pressurized fluid through the delivery conduit 15. Frontward portions of the dispensed product constantly move forward, and rearward portions of the dispensed product move forward to occupy the space vacated by the frontward portions. Further still, the product flows at low velocity, for example, 1 m/s or less, in a low volume of pressurized fluid relative to the volume of the product.

Referring again to FIG. 2, in some embodiments, the receiver vessel 26 optionally includes a second outlet 52 that is in fluid communication with a low pressure metering assembly 54. The low pressure metering assembly 54 includes a low pressure delivery device 56 or a low pressure metering device 58 in fluid communication with the receiver vessel 26 through a low pressure assembly regulator 60. Alternatively and referring to FIG. 1, a low pressure supply, such as a blower 55, may be included to provide a low pressure fluid to the low pressure metering assembly 54. Low pressure metering assemblies are well known in the art, and may, for example, place metered product behind soil openers of the agricultural implement.

Referring to FIG. 3, in some embodiments, the system 10 may include a vacuum metering assembly 62 in fluid communication with the inlet of the pressure source 30 or 30'. The vacuum metering assembly 62 includes a second receiver vessel 64 in fluid communication with a vacuum metering device 78. The second receiver vessel 64 includes a first outlet 66 in fluid communication with one of the bore side inlet 45 (and optionally the rod side inlet 44) and the compressor inlet 72 (FIGS. 4 and 5, respectively). Flow of the pressurized fluid between the second receiver vessel 64 and the pressure source 30' may be controlled by the compressor inlet regulator 74 (FIG. 5). The second receiver vessel 64 also includes an inlet 76 in fluid communication with the vacuum metering device 78 through a vacuum assembly regulator 80. Vacuum metering devices are well known in the art, and may, for example, be used to meter the product in a similar manner as a low pressure metering device.

The receiver vessel 26 and the regulators 22, 50, 60, 74, and 80 advantageously permit the pressure source 30 or 30' to provide a pressurized fluid to different components of the system 10 at different pressures. Referring to FIG. 2 for example, the pressurized fluid may be provided to the receiver vessel 26 at a high pressure (which may be greater than the threshold pressure described above). The receiver vessel 26 may in turn provide the pressurized fluid to the low pressure metering assembly 54 at a low pressure and the primary container 14 at an intermediate pressure. In addition, the regulators 22, 50, 60, 74, and 80 are operable to regulate the pressure of the pressurized fluid. Different types of dispensed products may be better suited to different operating pressures, and as a result, the regulators 22, 50, 60, 74, and 80 permit the system 10 to accommodate various types of dispensed products.

Referring to FIGS. 2 and 3, the system 10 may be modified without departing from the scope of the invention. For example, the receiver vessel 26 and the inlet regulator 22 may be removed from the system 10 so that the pressure source 30 is in direct fluid communication with the primary container 14. Instead, the pressurized fluid may be regulated by appropriate control of the actuator 32. As another example, if the system includes the vacuum metering assembly 62, the second receiver vessel 64 and the vacuum assembly regulator 80 may be removed so that the pressure source 30 is in direct fluid communication with the vacuum metering device 78. In addition, the system 10 may also include components for filtration, debris removal, and air relief.

The present invention provides an efficient system in which the pressurized fluid provided from the pressure source may be advantageously regulated and distributed to different assemblies of the system. In addition, the pressure source advantageously includes a pressure source that is relatively efficient compared to current designs. Further still, the present invention advantageously provides a relatively inexpensive design that operates in a manner that may be easily understood by an operator.

It is specifically intended that the present invention not be limited to the embodiments and illustrations contained herein, but include modified forms of those embodiments including portions of the embodiments and combinations of elements of different embodiments as come within the scope of the following claims.

We claim:

1. A pressure supply assembly for distributing a product on an agricultural implement, comprising:
   a pressure source including:
      a piston;
      a cylinder in which the piston moves, including:
         a bore side;
         a bore side inlet configured to permit a fluid to enter the bore side there through;
         a bore side outlet configured to permit the fluid to exit the bore side there through and in fluid communication with another section of the agricultural implement; and
      an actuator connected to the piston to displace the piston within the cylinder; wherein the actuator is a hydraulic actuator; wherein the bore side outlet is in fluid communication with a primary container and a delivery conduit that are configured for dense phase product flow; wherein the pressure source is in fluid communication with a metering assembly.

* * * * *